(12) United States Patent
Moon et al.

(10) Patent No.: US 9,409,771 B2
(45) Date of Patent: Aug. 9, 2016

(54) SUPERHYDROPHOBIC/AMPHIPHILIC (OLEOPHILIC) SURFACE WITH NANO STRUCTURE AND THE FABRICATION METHOD THEREOF

(75) Inventors: Myoung-Woon Moon, Seoul (KR); Kwang Ryeol Lee, Seoul (KR); Bong Su Shin, Seoul (KR); Ho-Young Kim, Seoul (KR)

(73) Assignee: KOREA INSTITUTE OF SCIENCE AN TECHNOLOGY, Seoul (KR)

( * ) Notice: Subject to any disclaimer, the term of this patent is extended or adjusted under 35 U.S.C. 154(b) by 1218 days.

(21) Appl. No.: 13/215,542

(22) Filed: Aug. 23, 2011

(65) Prior Publication Data

US 2012/0223011 A1 Sep. 6, 2012

(30) Foreign Application Priority Data

Mar. 3, 2011 (KR) .................. 10-2011-0019129

(51) Int. Cl.
| | | |
|---|---|---|
| *B01D 29/46* | (2006.01) | |
| *B01D 39/00* | (2006.01) | |
| *B01D 39/14* | (2006.01) | |
| *B01D 24/00* | (2006.01) | |
| *B82Y 30/00* | (2011.01) | |
| *B82Y 40/00* | (2011.01) | |
| *D04H 1/4382* | (2012.01) | |

(52) U.S. Cl.
CPC .................. *B82Y 30/00* (2013.01); *B82Y 40/00* (2013.01); *D04H 1/4382* (2013.01); *Y10T 428/24355* (2015.01)

(58) Field of Classification Search
CPC . C02F 1/288; B01D 2325/14; B32B 2255/26; B32B 11/046; B32B 11/10; B32B 2307/73; B32B 5/022; B82Y 30/00; B82Y 40/00; B41C 1/1008
USPC ................ 210/490, 500.27, 500.36, 650.506; 428/141; 438/492; 216/37; 427/569, 427/402, 525; 977/891
See application file for complete search history.

(56) References Cited

U.S. PATENT DOCUMENTS

| | | | |
|---|---|---|---|
| 8,163,633 B2* | 4/2012 | Korgel et al. .................. | 438/492 |
| 8,288,473 B2* | 10/2012 | Wang et al. ..................... | 525/89 |
| 2011/0223484 A1* | 9/2011 | Korgel et al. .............. | 429/231.5 |
| 2012/0006686 A1* | 1/2012 | Furman et al. ................ | 205/109 |
| 2012/0107556 A1* | 5/2012 | Zhang et al. .................. | 428/141 |
| 2012/0223011 A1* | 9/2012 | Moon et al. ................... | 210/506 |
| 2012/0274360 A1* | 11/2012 | Kultgen et al. ................ | 327/67 |

FOREIGN PATENT DOCUMENTS

| | | |
|---|---|---|
| JP | 2000-017091 A | 1/2000 |
| KR | 1020070044437 A | 4/2007 |
| KR | 1020100008579 A | 1/2010 |
| WO | 2010/115178 A1 | 10/2010 |

* cited by examiner

*Primary Examiner* — Ana Fortuna
(74) *Attorney, Agent, or Firm* — Ladas & Parry LLP

(57) ABSTRACT

Disclosed is a structure having a superhydrophobic and amphiphilic (oleophilic) surface and a fabrication method thereof. A polymer surface body disclosed herein may include high aspect ratio nanostructures on a surface thereof, wherein an aspect ration of the high aspect ratio nanostructure is 1 to 100, and may include a hydrophobic thin film on the high aspect ratio nanostructure. A method of fabricating a polymer surface body disclosed herein may include performing a surface modification treatment on a polymer to form a high aspect ratio nanostructure having an aspect ration of 1 to 100, and forming a hydrophobic thin film on a surface containing the nanostructures.

8 Claims, 7 Drawing Sheets

Superhydrophobic

Oleophilic (a)

(b)

SUPERHYDROPHOBIC/AMPHIPHILIC (OLEOPHILIC) SURFACE WITH NANO STRUCTURE AND THE FABRICATION METHOD THEREOF

RELATED APPLICATION

The present disclosure relates to subject matter contained in priority Korean Application No. 10-2011-0019129, filed on Mar. 3, 2011, which is herein expressly incorporated by reference in its entirety.

BACKGROUND OF THE INVENTION

1. Field of the Invention

The present invention relates to a structure having a superhydrophobic and amphiphilic(oleophilic) surface and a fabrication method thereof.

2. Background of the Invention

As the industry is developed, environmental problems have become remarkably obvious, thereby continuously increasing the demand for materials for separating and removing a particular material from a mixed material, such as oily water separation, seawater desalination, and the like. In particular, a lot of studies for separation filter or nonwoven fabric type materials have been carried out, and moreover, studies for performance enhancement in separation materials and applications thereof have been actively implemented. Technologies for separating water and oil from polluted water that is polluted with oil or the like are regarded highly important in the water treatment field. Materials for oily water separation should have a hydrophobic surface to water while at the same time having an amphiphilic(oleophilic) surface to oil.

Polymers such as polyethylene, polystyrene, and the like are primarily used for materials for oily water separation.

Nonwoven fabrics typically have an amphiphilic(oleophilic) and hydrophobic characteristic, but the hydrophobic characteristic (contact angle) thereof is about 100 degrees, and thus additional enhancement of the hydrophobic characteristic may be required for nonwoven fabrics to be used as a material for oily water separation.

In order to be used as a material for oily water separation, preferably, the contact angle to pure water should be 150 degrees or more and the contact angle hysteresis should be 10 degrees or less. Hence, studies for making a superhydrophobic surface having a small contact angle hysteresis like a lotus leaf surface in nature have been carried out. If a solid surface having such a superhydrophobic property is used, then fluid may not be formed on a superhydrophobic surface thereof, and as a result, the surface will be automatically cleaned. Furthermore, it has high usefulness to be used as a channel inner wall surface having a low resistance to fluid and drop flow in a microfluid device.

SUMMARY OF THE INVENTION

An object of the present invention is to provide a surface including a high aspect ratio shaped nanostructure with an aspect ration of 1:100 in which a polymer material is plasma or ion-beam treated by using a simple method, and a fabrication method thereof. Furthermore, another object of the present invention is to provide a surface having both a superhydrophobic characteristic with water contact angle of 150 degrees or more and an amphiphilic(oleophilic) characteristic with a contact angle to oil (for example, nucleic acid) of 20 degrees or less in which a hydrophobic thin film having a low surface energy is formed on a nanostructure to enhance a hydrophobic surface to pure water, and a fabrication method thereof.

A polymer surface body disclosed herein may include high aspect ratio nanostructures on a surface thereof, wherein an aspect ration of the high aspect ratio nanostructure is 1 to 100, and may include a hydrophobic thin film on the high aspect ratio nanostructure. A method of fabricating a polymer surface body disclosed herein may include performing a surface modification treatment on a polymer to form a high aspect ratio nanostructure having an aspect ration ('an aspect ration' is 'a height to width ratio' in the specification of the present application) of 1 to 100, and forming a hydrophobic thin film on a surface containing the nanostructures.

According to the present invention, it may be possible to obtain a polymer surface body including a high aspect ratio nanostructure having an aspect ration of 1 to 100 on the surface thereof. In addition, according to the present invention, there is provided a polymer surface body having a hydrophobic surface with water contact angle of 150 degrees or more and a contact angle hysteresis of 10 degrees or less and an amphiphilic(oleophilic) surface with a contact angle to oil of 20 degrees or less, and thus the polymer surface body can be used as an effective material for oily water separation, thereby providing a relatively simple fabrication method.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

A polymer surface body according to the present invention may include high aspect ratio nanostructures on a surface thereof, wherein an aspect ration of the high aspect ratio nanostructure is 1 to 100, and may include a hydrophobic thin film on the high aspect ratio nanostructure. The polymer surface body formed with a hydrophobic thin film on the high aspect ratio nanostructure in this manner shows a superhydrophobic property together with an amphiphilic(oleophilic)

property, and thus water drops cannot be formed on a superhydrophobic surface thereof, thereby having an automatic surface cleaning function. Hence, it can be used as a channel inner wall surface and a material for oily water separation having a low resistance to fluid and drop flow in a microfluid device.

A width of the nanostructure may be 1 to 1000 nm, and a length of the nanostructure may be 1 to 1000 nm. Preferably, a width of the nanostructure may be 10 to 30 nm, and a length of the nanostructure may be 500 to 1000 nm, and thus a length (height) to width ratio of the nanostructure may be about 1:100, and they may be distributed in a form that nano-hairs having a very high aspect ratio stand upright.

A material of the polymer surface body may be made of at least any one selected from a group consisting of PET (polyethyleneterephthalate), PP (polypropylene), PTFE (polytetrafluoroethylene) and PVDF (polyvinylidene fluoride), and the hydrophobic thin film may be any one of a fluoride thin film, a fluoride-containing carbon thin film, and an organic silicon hydride thin film.

In order to enhance a hydrophobic characteristic of the material, the contact angle to pure water should be large, like 150 degrees or more, and the contact angle hysteresis should be small, like 10 degrees or less. In case where the contact angle to pure water is 150 degrees or more, and the contact angle hysteresis is 10 degrees or less, it may be possible to form a superhydrophobic surface having a small contact angle hysteresis like a lotus leaf in nature, and a material for oily water separation of the present invention may include a polymer surface body according to the present invention.

Figure 1:
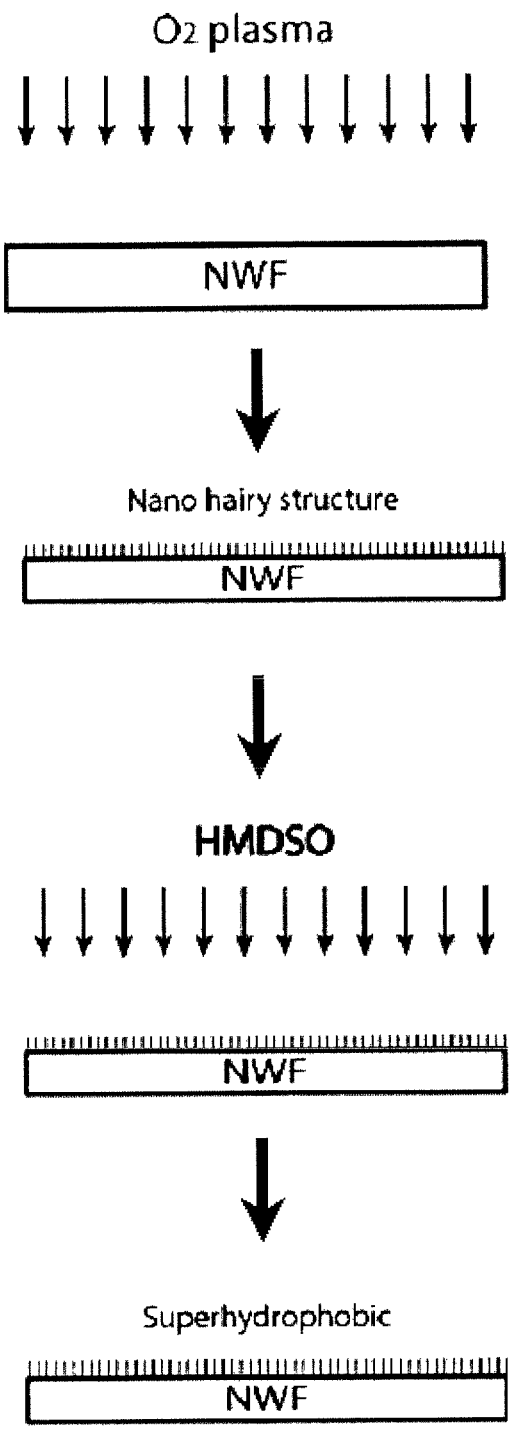
FIG. 1 is a mimetic diagram illustrating the process of fabricating a polymer surface body according to the present invention.
Figure 2:
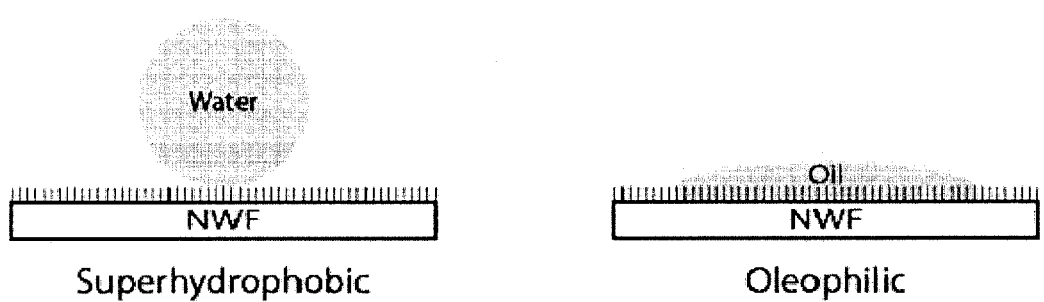
FIG. 2 is a conceptual view illustrating a superhydrophobic characteristic and an amphiphilic(oleophilic) characteristic of a polymer surface body according to the present invention.

A method of fabricating a polymer surface body according to the present invention may include performing a surface modification treatment on a polymer to form a high aspect ratio nanostructure having an aspect ration of 1 to 100, and forming a hydrophobic thin film on a surface containing the nanostructures. FIG. 1 is a mimetic diagram illustrating the process of fabricating a polymer surface body according to the present invention, and FIG. 2 is a conceptual view illustrating a superhydrophobic characteristic and an amphiphilic (oleophilic) characteristic of a polymer surface body according to the present invention.

The surface modification treatment may be a plasma treatment or ion-beam treatment. When the nanostructure is formed by using a plasma treatment, the plasma treatment may use at least any one selected from a group consisting of O2, CH4, and Ar, and the plasma treatment may be carried out in a voltage range of −100 to 1000 Vb.

Hereinafter, the present invention will be described in more detail through an embodiment of the present invention and a comparative example thereof. However, it is merely provided to describe the present invention, and the present invention will not be limited by this.

Embodiment

In this embodiment, as a polymer, a nonwoven fabric (LG Chemicals) made of PET was purchased and used. Plasma was treated on the prepared polymer nonwoven fabric to form a nanostructure. The plasma was formed by using oxygen gas as a precursor by employing a plasma assisted chemical vapor deposition (PACVD) process at 13.56 MHz. A substrate on a RF power water cooled cathode was delivered through an impedance matching path. A surface treatment was performed in the condition of 0.49 Pa, and −600 Vb for 1 to 60 minutes. In order to secure a superhydrophobic characteristic on a high aspect ratio nanostructure formed by using the oxygen plasma, hexamethyldisiloxane (HMDSO), which is a hydrophobic thin film, was coated in the condition of 10 mTorr, −400 V, and 20 sccm.

Comparative Example

In order to compare with the present invention, only a nanostructure formation process was performed among the processes of hydrophobic thin film formation and nanostructure formation, and a polymer surface body that is not is formed with a hydrophobic thin film was formed.

The surface characteristic of a polymer surface body formed as described above was measured for comparison. A SEM photo using a scanning microscope and a contact angle prior to and subsequent to surface modification using distilled water and oil (nucleic acid) were measured. The contact angle was measured by using a NRL contact angle goniometer. It was measured by using the method of setting the base line of the substrate to fit therein and lightly dropping a water drop and then rotating the goniometer to read a measurement angle. A contact angle measurement photo was captured by using a GBX device.

Figure 3:
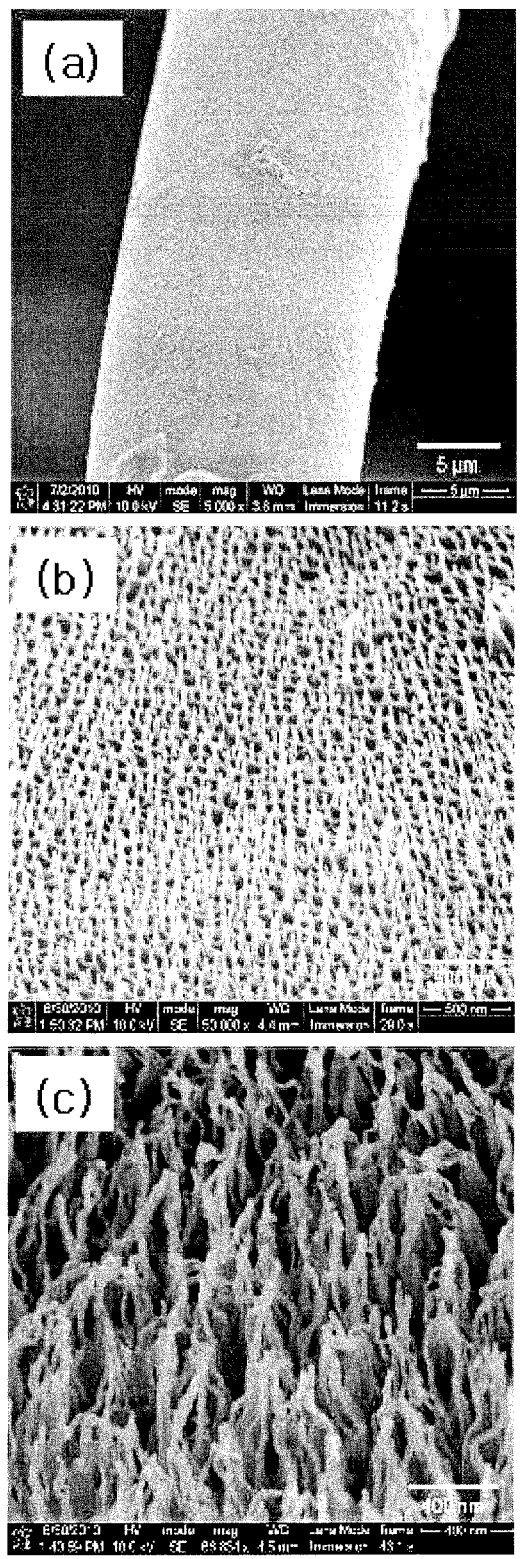
FIG. 3 is a scanning electron microscope (SEM) image of a high aspect ratio nanostructure according to an oxygen plasma treatment time.

FIG. 3 is an SEM image of a high aspect ratio nanostructure according to an oxygen plasma treatment time. As illustrated in FIG. 3, when oxygen gas plasma was treated at −400 Vb for 1 to 60 minutes, they were distributed in a form that nano-hair structures with a size having a width of the nanostructure of 10 to 30 nm and a length of 500-1000 nm (1 μm) stand upright.

Figure 4:
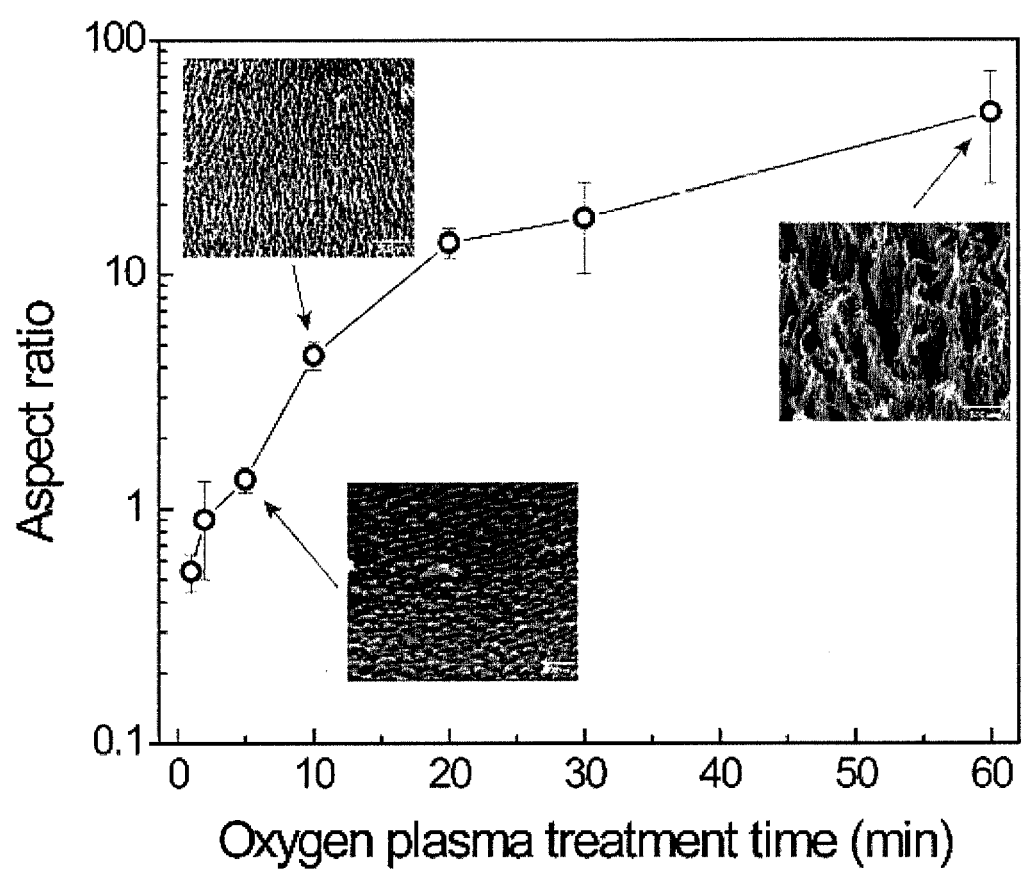
FIG. 4 is a graph illustrating a proportion (ratio of width/height) of a high aspect ratio nanostructure according to an oxygen plasma treatment time.
Figure 5:
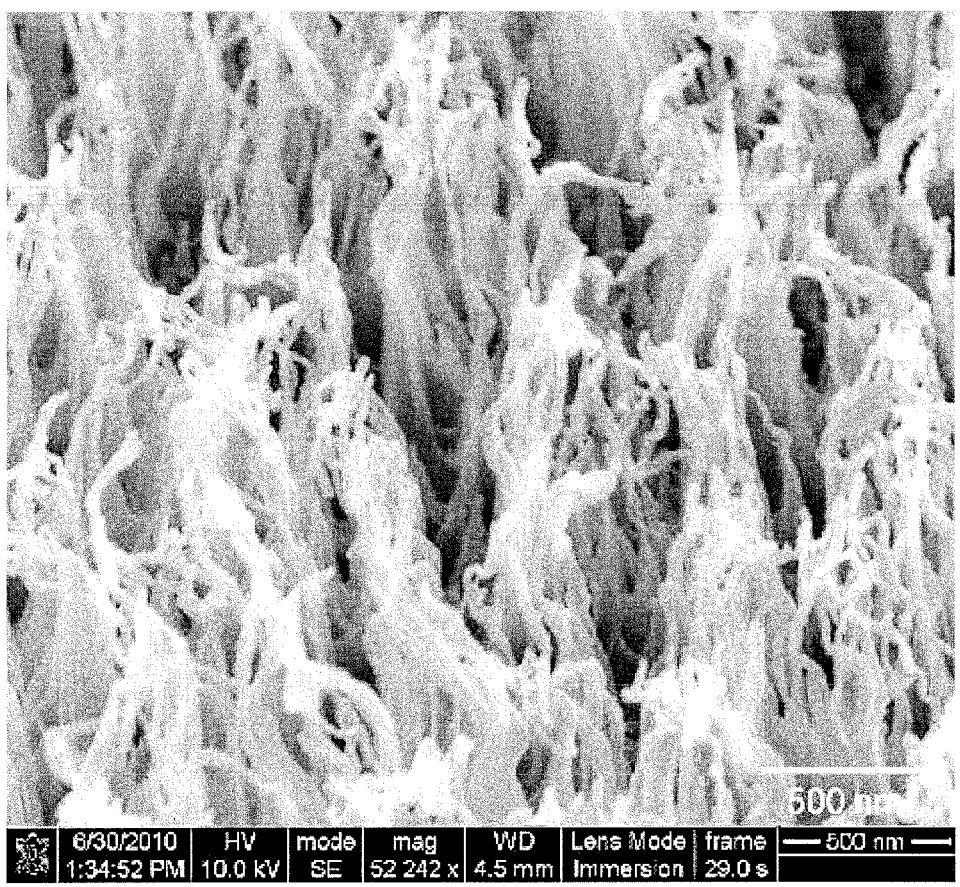
FIG. 5 is an SEM image of a polymer surface body fabricated according to an embodiment of the present invention.

FIG. 4 is a graph illustrating a proportion (ratio of width/height) of a high aspect ratio nanostructure according to an oxygen plasma treatment time. An aspect ratio refers to a value in which the length of a nanostructure formed on the surface thereof is divided by the diameter, and it was confirmed that the aspect ratio of a nanostructure formed on the surface thereof was changed from about 1 to 70 according to an oxygen plasma treatment time. On the other hand, FIG. 5 is an SEM image of a polymer surface body fabricated according to an embodiment of the present invention (oxygen plasma treatment for 60 minutes).

Figure 6:
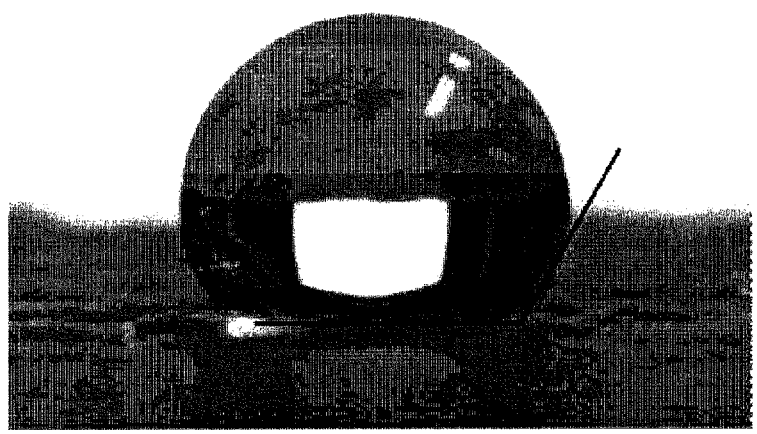
FIG. 6A is a comparative example.
FIG. 6B is an optical image illustrating a pure drop wet behavior of a polymer surface according to an embodiment of the present invention.
Figure 6:
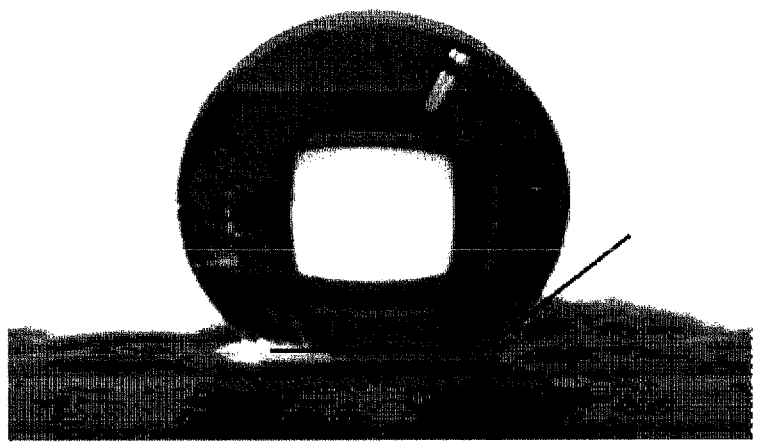

FIG. 6 is a pure drop behavior on a nonwoven fabric (embodiment) treated at −400 V for 60 minutes and formed with a hydrophobic thin film (HMDSO was treated in the condition of −400 V, 20 sccm, and 10 mTorr for 30 minutes) using a nonwoven fabric on which a surface treatment such as nanostructure formation and hydrophobic thin film formation has not been performed and oxygen gas plasma. As illustrated in FIG. 6, water contact angle was increased from about 100 degrees in the comparative example to about 160 degrees in the embodiment of 60 minutes treatment, and thus it is seen that the surface body was changed to a superhydrophobic surface. It may be understood that the hydrophobic property was increased by a structure having convex nano-hairy formation.

Figure 7:
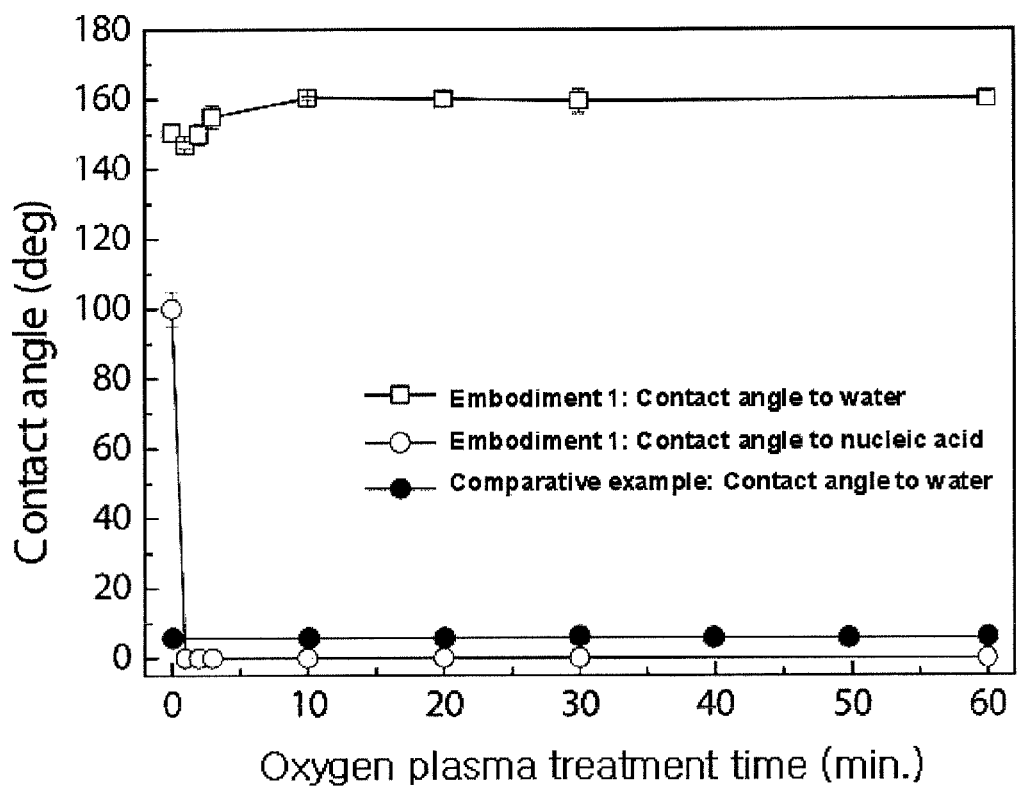
FIG. 7 is a graph illustrating water contact angle drop and nucleic acid according to a change of the plasma treatment time and an embodiment of the present invention and a comparative example thereof.

FIG. 7 illustrates a contact angle to water and a contact angle to oil on a hydrophilic surface treated nonwoven fabric and a superhydrophobic surface treated nonwoven fabric. Here, the contact angle to water maintains at the same level immediately after dropping oil. A material having a low surface energy like oil (nucleic acid) compared to water was formed with a nanostructure to increase the amphiphilic (oleophilic) property on a solid surface having a lower surface energy. In other words, as a result of FIG. 7, it was confirmed that an amphiphilic (oleophilic) surface having a nanostructure becomes a superoleophilic surface.

As described above, it was observed that nanostructures with a convex-shaped nanostructure or concave-hole-shaped nanostructure having a very wide surface area were created in case where oxygen plasma was treated for 1 to 60 minutes, and the shape of the nanostructures may be controlled according to each condition. As a result, it may be possible to increase a surface area thereof, and increase the hydrophobic property of a polymer surface using a nonwoven fabric surface modification with this method.

What is claimed is:

1. A material for oily water separation comprising a polymer surface body that comprises:

high aspect ratio nanostructures on a surface thereof, wherein an aspect ratio of the high aspect ratio nanostructure is 1 to 100;

a hydrophobic thin film on the high aspect ratio nanostructure wherein a water contact angle of the polymer surface body is 150 degrees or more and a contact angle to oil of the polymer surface body is 20 degrees or less wherein the polymer surface body is made of at least any one selected from a group consisting of PET (polyethyleneterephthalate), PP (polypropylene), PTFE (polytetrafluoroethylene), and PVDF (polyvinylidene fluoride).

2. The material for oily water separation of claim 1, wherein a width of the nanostructure is 1 to 1000 nm, and a length of the nanostructure is 1 to 1000 nm.

3. The material for oily water separation of claim 1, wherein the hydrophobic thin film is any one of a fluoride thin film, a fluoride-containing carbon thin film, and an organic silicon hydride thin film.

4. The material for oily water separation of claim 1, wherein a contact angle hysteresis to pure water of the polymer surface body is 10 degrees or less.

5. A material for oily water separation comprising a polymer surface body that comprises:

high aspect ratio nanostructures on a surface thereof, wherein an aspect ratio of the high aspect ratio nanostructure is 1 to 100;

a hydrophobic thin film on the high aspect ratio nanostructure wherein a water contact angle of the polymer surface body is 150 degrees or more and a contact angle to oil of the polymer surface body is 20 degrees or less wherein the polymer surface body comprises a nonwoven fabric.

6. The material for oily water separation of claim 5, wherein a width of the nanostructure is 1 to 1000 nm, and a length of the nanostructure is 1 to 1000 nm.

7. The material for oily water separation of claim 5, wherein the hydrophobic thin film is any one of a fluoride thin film, a fluoride-containing carbon thin film, and an organic silicon hydride thin film.

8. The material for oily water separation of claim 5, wherein a contact angle hysteresis to pure water of the polymer surface body is 10 degrees or less.

* * * * *